US012680471B2

(12) United States Patent
Sanzari et al.

(10) Patent No.: US 12,680,471 B2
(45) Date of Patent: Jul. 14, 2026

(54) BEARING ASSEMBLY HOUSING FOR AN AIRCRAFT PROPULSION SYSTEM

(71) Applicant: Pratt & Whitney Canada Corp., Longueuil (CA)

(72) Inventors: Lorenzo Sanzari, Montreal (CA); Guy Lefebvre, St-Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/909,614

(22) Filed: Oct. 8, 2024

(65) Prior Publication Data

US 2026/0098483 A1 Apr. 9, 2026

(51) Int. Cl.
  *F01D 25/16* (2006.01)
  *B64D 35/00* (2006.01)
(52) U.S. Cl.
  CPC .......... *F01D 25/162* (2013.01); *B64D 35/00* (2013.01); *F05D 2220/323* (2013.01); *F05D 2240/50* (2013.01)
(58) Field of Classification Search
  CPC ...... F16C 2360/23; F16C 27/04; F16C 19/54; F16C 35/042; F16C 35/067; F16C 2360/24; F16C 33/6659; F16C 33/6685; F16C 35/045; F16C 2226/00; F16C 27/066; F01D 25/164; F01D 25/162; F01D 21/045; F01D 25/16; F01D 25/243; F01D 9/065; F01D 25/24; F01D 25/28; F05D 2240/50; F05D 2240/54; F05D 2220/32; F05D 2220/323; F05D 2240/14; F04D 29/059; B64D 35/00
  See application file for complete search history.

(56) References Cited

U.S. PATENT DOCUMENTS

| | | | |
|---|---|---|---|
| 3,011,840 | A | 12/1961 | Littleford |
| 4,668,108 | A | 5/1987 | McHugh |
| 7,802,962 | B2 | 9/2010 | Roger |

(Continued)

FOREIGN PATENT DOCUMENTS

CN   114593155 B   6/2023

OTHER PUBLICATIONS

EP Search Report for EP Patent Application No. 25207567.6 dated Feb. 5, 2026.

*Primary Examiner* — Eric J Zamora Alvarez
(74) *Attorney, Agent, or Firm* — Getz Balich LLC

(57) ABSTRACT

An engine includes a bearing assembly. The bearing assembly includes a bearing compartment housing, a first bearing, and a second bearing. The bearing compartment housing extends circumferentially about a rotational axis. The bearing compartment housing includes an outer housing body, an inner housing body, and a plurality of struts. The outer housing body surrounds and forms a bearing compartment. The inner housing body extends between and to an inner radial side and an outer radial side. The inner housing body forms a plurality of transverse slots extending through the inner housing body from the inner radial side to the outer radial side. The plurality of struts connect the inner housing body and the outer housing body. The first bearing is mounted on the inner housing body at a first axial position. The second bearing is mounted on the inner housing body at a second axial position.

14 Claims, 10 Drawing Sheets

(56)　　　　　References Cited

U.S. PATENT DOCUMENTS

| 7,857,519 | B2 * | 12/2010 | Kostka .................... F16C 27/04 |
| | | | 384/535 |
| 8,182,156 | B2 | 5/2012 | Kinnaird |
| 8,322,038 | B1 * | 12/2012 | Heidari ................ F01D 25/164 |
| | | | 29/898.07 |
| 8,727,629 | B2 | 5/2014 | Do |
| 8,727,632 | B2 * | 5/2014 | Do ...................... F16C 33/4623 |
| | | | 384/534 |
| 8,747,054 | B2 * | 6/2014 | Witlicki ................... F02C 7/06 |
| | | | 415/119 |
| 9,109,622 | B2 | 8/2015 | Meacham |
| 10,001,028 | B2 | 6/2018 | Ganiger |
| 10,563,539 | B2 | 2/2020 | Tulej |
| 10,577,972 | B2 | 3/2020 | Patsouris et al. |
| 10,844,746 | B2 * | 11/2020 | Lefebvre ............... F16C 33/405 |
| 11,460,037 | B2 | 10/2022 | Lefebvre |
| 2007/0031078 | A1 * | 2/2007 | Hackett ................ F16C 27/045 |
| | | | 384/535 |
| 2013/0108202 | A1 | 5/2013 | Do |
| 2017/0145855 | A1 * | 5/2017 | Ganiger ............... F16C 35/067 |
| 2017/0226894 | A1 * | 8/2017 | Ganiger ................. F16C 27/04 |
| 2017/0234157 | A1 * | 8/2017 | Khan ..................... F16C 27/04 |
| | | | 415/229 |
| 2021/0215066 | A1 | 7/2021 | Lefebvre |
| 2023/0117756 | A1 | 4/2023 | Brault |
| 2024/0151158 | A1 | 5/2024 | Bhujabal |
| 2024/0151238 | A1 | 5/2024 | Levisse |

* cited by examiner

BEARING ASSEMBLY HOUSING FOR AN AIRCRAFT PROPULSION SYSTEM

TECHNICAL FIELD

This disclosure relates to bearing assemblies for an engine of an aircraft propulsion system and, more particularly, to bearing compartment housings.

BACKGROUND OF THE ART

Rotational equipment, such as those typically found in an engine for an aircraft propulsion system, may include one or more bearing assemblies configured to rotationally support components the rotational equipment. Various types and configurations of bearing assemblies are known in the art. While these known bearing assemblies may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an engine for an aircraft propulsion system includes a rotational assembly and a bearing assembly. The rotational assembly includes a shaft. The shaft is rotatable about a rotational axis. The bearing assembly includes a bearing compartment housing, a first bearing, and a second bearing. The bearing compartment housing extends circumferentially about the rotational axis. The bearing compartment housing includes an outer housing body, an inner housing body, and a plurality of struts. The outer housing body surrounds and forms a bearing compartment. The inner housing body is disposed within the bearing compartment. The inner housing body extends between and to an inner radial side and an outer radial side. The inner housing body forms a plurality of transverse slots extending through the inner housing body from the inner radial side to the outer radial side. The plurality of struts extend radially between and connect the inner housing body and the outer housing body at the outer radial side. The first bearing is mounted on the inner housing body at a first axial position. The first bearing is rotationally engaged with the shaft. The second bearing is mounted on the inner housing body at a second axial position, different than the first axial position. The second bearing is rotationally engaged with the shaft.

In any of the aspects or embodiments described above and herein, the inner housing body may extend axially between and to a first axial side and a second axial side, the first bearing may be disposed at the first axial side, and the second bearing may be disposed at the second axial side.

In any of the aspects or embodiments described above and herein, the plurality of struts may be disposed axially between the first bearing and the second bearing.

In any of the aspects or embodiments described above and herein, the plurality of transverse slots may be disposed axially coincident with the plurality of struts.

In any of the aspects or embodiments described above and herein, each of the plurality of transverse slots may be disposed circumferentially between each circumferentially adjacent pair of the plurality of struts.

In any of the aspects or embodiments described above and herein, more than one of the plurality of transverse slots may be disposed circumferentially between each circumferentially adjacent pair of the plurality of struts.

In any of the aspects or embodiments described above and herein, the plurality of transverse slots may be axially closer to the first bearing than the second bearing.

In any of the aspects or embodiments described above and herein, the plurality of struts may have a strut center plane orthogonal to the rotational axis and each of the plurality of transverse slots may extend axially between and to a first axial end and a second axial end. Each of the plurality of transverse slots may have a length extending axially between and to the first axial end and the second axial end. The length may have a first length portion and a second length portion. The first length portion may extend between and to the first axial end and the strut center plane. The second length portion may extend between and to the strut center plane and the second axial end.

In any of the aspects or embodiments described above and herein, the first length portion may be greater than the second length portion.

In any of the aspects or embodiments described above and herein, each of the plurality of transverse slots may extend between and to a first circumferential end and a second circumferential end, each of the transverse slots may have a width extending between and to the first circumferential end and the second circumferential end, and the width may vary along the length.

According to another aspect of the present disclosure, an engine for an aircraft propulsion system includes a rotational assembly and a bearing assembly. The rotational assembly includes a shaft. The shaft is rotatable about a rotational axis. The bearing assembly includes a bearing compartment housing, a first bearing, and a second bearing. The bearing compartment housing extends circumferentially about the rotational axis. The bearing compartment housing includes an outer housing body, an inner housing body, and a plurality of struts interconnecting the outer housing body and the inner housing body. The outer housing body surrounds and forms a bearing compartment. The inner housing body is disposed within the bearing compartment. The inner housing body extends radially between and to an inner radial side and an outer radial side. The inner housing body extends axially between and to a first axial side and a second axial side. The inner housing body forms a plurality of transverse slots axially between the first bearing and the second bearing and extending through the inner housing body from the inner radial side to the outer radial side. The first bearing is mounted on the inner radial side at the first axial side. The first bearing is rotationally engaged with the shaft. The second bearing is mounted on the inner radial side at the second axial side. The second bearing is rotationally engaged with the shaft.

In any of the aspects or embodiments described above and herein, the plurality of struts may be disposed axially between the first bearing and the second bearing.

In any of the aspects or embodiments described above and herein, the plurality of transverse slots may be disposed axially coincident with the plurality of struts.

In any of the aspects or embodiments described above and herein, each of the plurality of transverse slots may be disposed circumferentially between each circumferentially adjacent pair of the plurality of struts.

In any of the aspects or embodiments described above and herein, more than one of the plurality of transverse slots may be disposed circumferentially between each circumferentially adjacent pair of the plurality of struts.

In any of the aspects or embodiments described above and herein, the plurality of transverse slots may be axially closer to the first bearing than the second bearing.

According to another aspect of the present disclosure, an engine for an aircraft propulsion system includes a rotational assembly and a bearing assembly. The rotational assembly includes a shaft. The shaft is rotatable about a rotational axis. The bearing assembly includes a bearing compartment housing, a first bearing, and a second bearing. The bearing compartment housing extends circumferentially about the rotational axis. The bearing compartment housing includes an outer housing body, an inner housing body, and a plurality of struts. The outer housing body surrounds and forms a bearing compartment. The inner housing body is disposed within the bearing compartment. The inner housing body extends between and to an inner radial side and an outer radial side. The inner housing body forms a plurality of transverse slots extending through the inner housing body from the inner radial side to the outer radial side. Each of the plurality of transverse slots is disposed circumferentially between a circumferentially adjacent pair of the plurality of struts. The plurality of struts extend radially between and connect the inner housing body and the outer housing body at the outer radial side. The first bearing and the second bearing are mounted on the inner housing body and rotationally engaged with the shaft.

In any of the aspects or embodiments described above and herein, the plurality of transverse slots may be axially closer to the first bearing than the second bearing.

In any of the aspects or embodiments described above and herein, the plurality of struts may have a strut center plane orthogonal to the rotational axis and each of the plurality of transverse slots extends axially between and to a first axial end and a second axial end. Each of the plurality of transverse slots may have a length extending axially between and to the first axial end and the second axial end, the length may have a first length portion and a second length portion, the first length portion may extend between and to the first axial end and the strut center plane, and the second length portion may extend between and to the strut center plane and the second axial end.

In any of the aspects or embodiments described above and herein, the first length portion may be greater than the second length portion.

The present disclosure, and all its aspects, embodiments and advantages associated therewith will become more readily apparent in view of the detailed description provided below, including the accompanying drawings.

DETAILED DESCRIPTION

Figure 1:
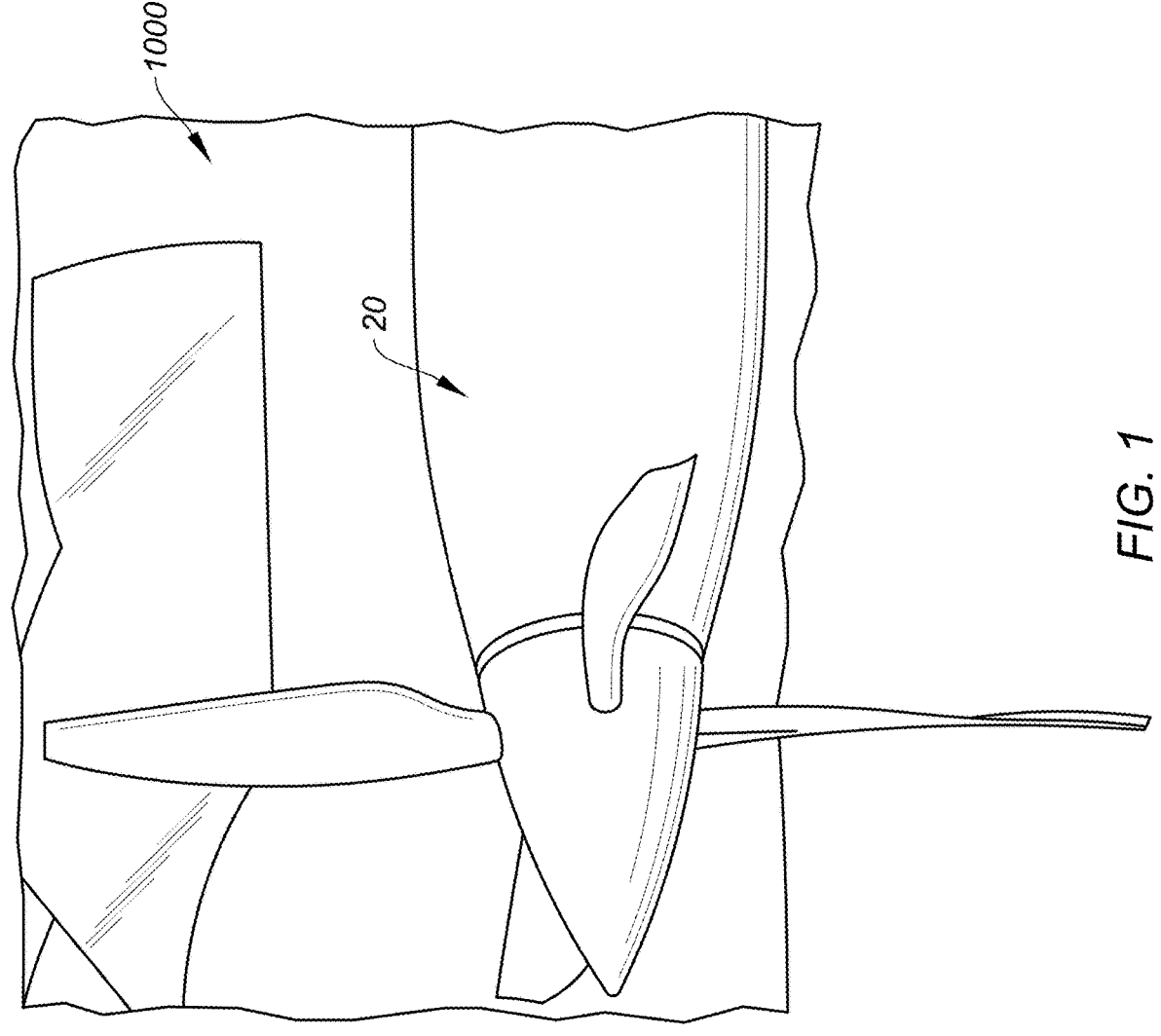
FIG. 1 illustrates an aircraft including a propulsion system, in accordance with one or more embodiments of the present disclosure.

FIG. 1 illustrates an aircraft 1000 including a propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
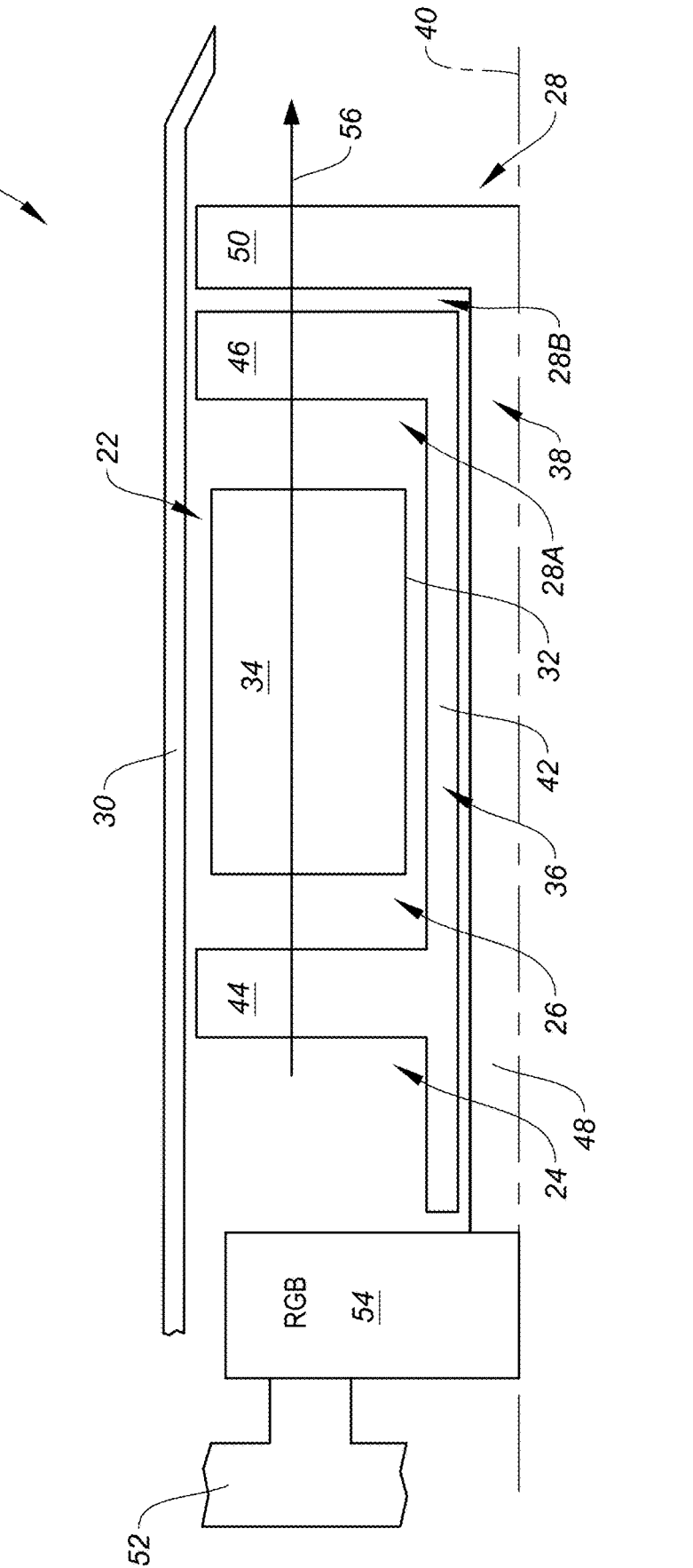
FIG. 2 schematically illustrates a cutaway, side view of an aircraft propulsion system, in accordance with one or more embodiments of the present disclosure.

FIG. 2 schematically illustrates a cutaway, side view of an exemplary configuration of the propulsion system 20. The propulsion system 20 of FIG. 2 includes an engine 22. The engine 22 is configured as a gas turbine engine. In particular, the engine 22 is configured as a turboprop gas turbine engine. However, the present disclosure is not limited to any particular configuration of gas turbine engine for the propulsion assembly 20, and examples of gas turbine engine configurations for the propulsion system 20 may include, but are not limited to, a turbofan engine, a turbojet engine, a propfan engine, or the like.

The engine 22 of FIG. 2 includes a compressor section 24, a combustor section 26, a turbine section 28, and an engine static structure 30. The combustor section 26 includes a combustor 32 (e.g., an annular combustor) forming a combustion chamber 34. The turbine section 28 includes a high-pressure turbine section 28A and a power turbine section 28B.

Components of the compressor section 24 and the turbine section 28 of FIG. 2 form a first rotational assembly 36 (e.g., a high-pressure spool) and a second rotational assembly 38 of the engine 22. The first rotational assembly 36 and the second rotational assembly 38 are mounted for rotation about a rotational axis 40 (e.g., an axial centerline) of the engine 22 relative to the engine static structure 30.

The first rotational assembly 36 includes a first shaft 42, a bladed compressor rotor 44 for the compressor section 28, and a bladed first turbine rotor 46 for the high-pressure turbine section 28A. The first shaft 42 interconnects the bladed compressor rotor 44 and the bladed first turbine rotor 46.

The second rotational assembly 38 includes a second shaft 48 and a bladed second turbine rotor 50 for the power turbine section 28B. The second shaft 48 is connected to the bladed second turbine rotor 50. The second shaft 48 operably connects (e.g., directly or indirectly connects) the bladed second turbine rotor 50 with a propulsor 52 of the propulsion system 20. As shown in FIG. 2, for example, the second shaft 48 may be coupled with the propulsor 52 by a reduction gear box 54. The reduction gear box 54 may include a gear assembly (e.g., an epicyclic gear assembly) configured to drive the propulsor 52 at a reduced rotational speed relative to the second shaft 48. Of course, the second shaft 48 may alternatively be directly connected to the propulsor 52 to drive the propulsor 52 at the same rotational speed as the second shaft 48.

The engine static structure 30 includes engine casings, cowlings, and other fixed (e.g., non-rotating) structures of the engine 22 which house and/or support components of the engine 22 such as, but not limited to, those of the compressor section 24, the combustor section 26, and the turbine section 28. The engine static structure 30 further includes one or more bearing assemblies configured to rotationally support components of the first rotational assembly 36 and the second rotational assembly 38.

During operation of the propulsion system 20 of FIG. 2, ambient air enters the propulsion system 20 through an air intake into and through a core flow path 56 of the engine 22. The ambient air flow along the core flow path 56 is compressed in the compressor section 24 and directed into the combustion chamber 34 of the combustor 32 within the combustor section 26. Fuel is injected into the combustion chamber 34 and mixed with the compressed air to provide a fuel-air mixture. This fuel-air mixture is ignited, and combustion products thereof flow through the high-pressure turbine section 28A and the power turbine section 28B and are exhausted from the propulsion system 20. The bladed first turbine rotor 46 and the bladed second turbine rotor 50 rotationally drive the first rotational assembly 36 and the second rotational assembly 38, respectively, in response to the combustion gas flow through the high-pressure turbine section 28A and the power turbine section 28B.

Figure 3:
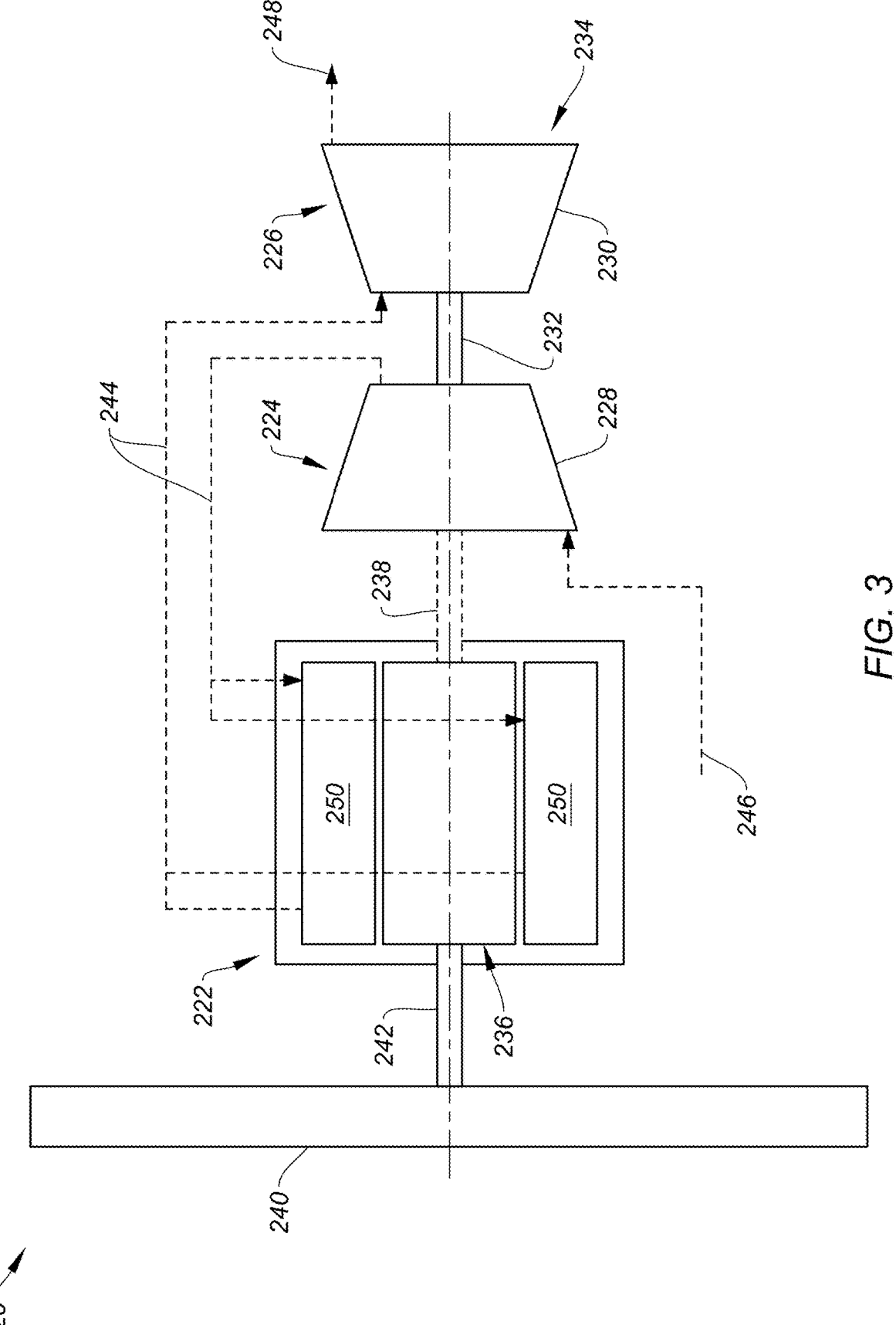
FIG. 3 schematically illustrates a cutaway, side view of another aircraft propulsion system, in accordance with one or more embodiments of the present disclosure.

FIG. 3 schematically illustrates a cutaway, side view of another exemplary configuration of the propulsion system 20. The propulsion system 20 of FIG. 3 may be configured with a turbocharged or turbo-compound engine. The propulsion system 20 of FIG. 3 includes an engine 222, a compressor section 224 (e.g., an engine compressor), and a turbine section 226 (e.g., an engine turbine). The engine 222 is configured as an intermittent internal combustion engine such as, but not limited to, a rotary engine or a reciprocating piston engine. An example of the rotary engine is a Wankel engine. Examples of the reciprocating piston engine include a radial engine, an inline (I) engine, a V-engine, and a W-engine. The compressor section 224 includes a bladed compressor rotor 228. The turbine section 226 includes a bladed turbine rotor 230. The bladed turbine rotor 230 is coupled to and rotatable with the bladed compressor rotor 228. The bladed turbine rotor 230 of FIG. 3, for example, is connected to the bladed compressor rotor 228 through a shaft 232. At least (or only) a combination of the bladed compressor rotor 228, the bladed turbine rotor 230, and the shaft 232 may collectively form a turbo-compressor rotational assembly 234 (e.g., a spool). This turbo-compressor rotational assembly 234 may be rotationally discrete from an engine rotational assembly 236 of the engine 222. Alternatively, the turbo-compressor rotational assembly 234 may be operatively coupled to and rotatable with the engine rotational assembly 236 through a drive train 238. The drive train 238 may be configured as a direct drive train or a geared drive train. The engine rotational assembly 236 is coupled to and rotatable with a propulsor 240 (e.g., a propeller) of the propulsion system 20 of FIG. 3 by a drive train 242. The drive train 242 may be configured as a direct drive train or a geared drive train.

The propulsion system 20 of FIG. 3, including the engine 222, the compressor section 224, and the turbine section 226, forms a flow path 244 (e.g., a core flowpath). This flow path 244 extends from an inlet 246 into the propulsion system 20 to a combustion products exhaust 248 from the propulsion system 20. More particularly, the flow path 244 extends sequentially through the compressor section 224, through one or more combustion zones 250 (e.g., combustion chambers, cylinder chambers, etc.) within the engine 222, and through the turbine section 226 from the inlet 246 to the exhaust 248. With this arrangement, air delivered to the engine 222 is compressed by the bladed compressor rotor 228, and combustion products produced by combustion of a mixture of the compressed air and fuel within the combustion zone(s) 250 drive rotation of the turbo-compressor rotational assembly 234 and the bladed turbine rotor 230, for example, about a rotational axis 252 of the turbo-compressor rotational assembly 234. Combustion of the fuel within the combustion zone(s) 250 further drives rotation of the engine rotational assembly 236. The rotation of the engine rotational assembly 236 drives rotation of the propulsor 240. The rotation of the bladed turbine rotor 230 drives rotation of the bladed compressor rotor 228 to facilitate the compression of the incoming air to the engine 222. The rotation of the bladed turbine rotor 230 may also assist driving rotation of the engine rotational assembly 236 where the turbo-compressor rotational assembly 234 is coupled to the engine rotational assembly 236 through the optional direct drive or geared drive train 238.

Figure 4:
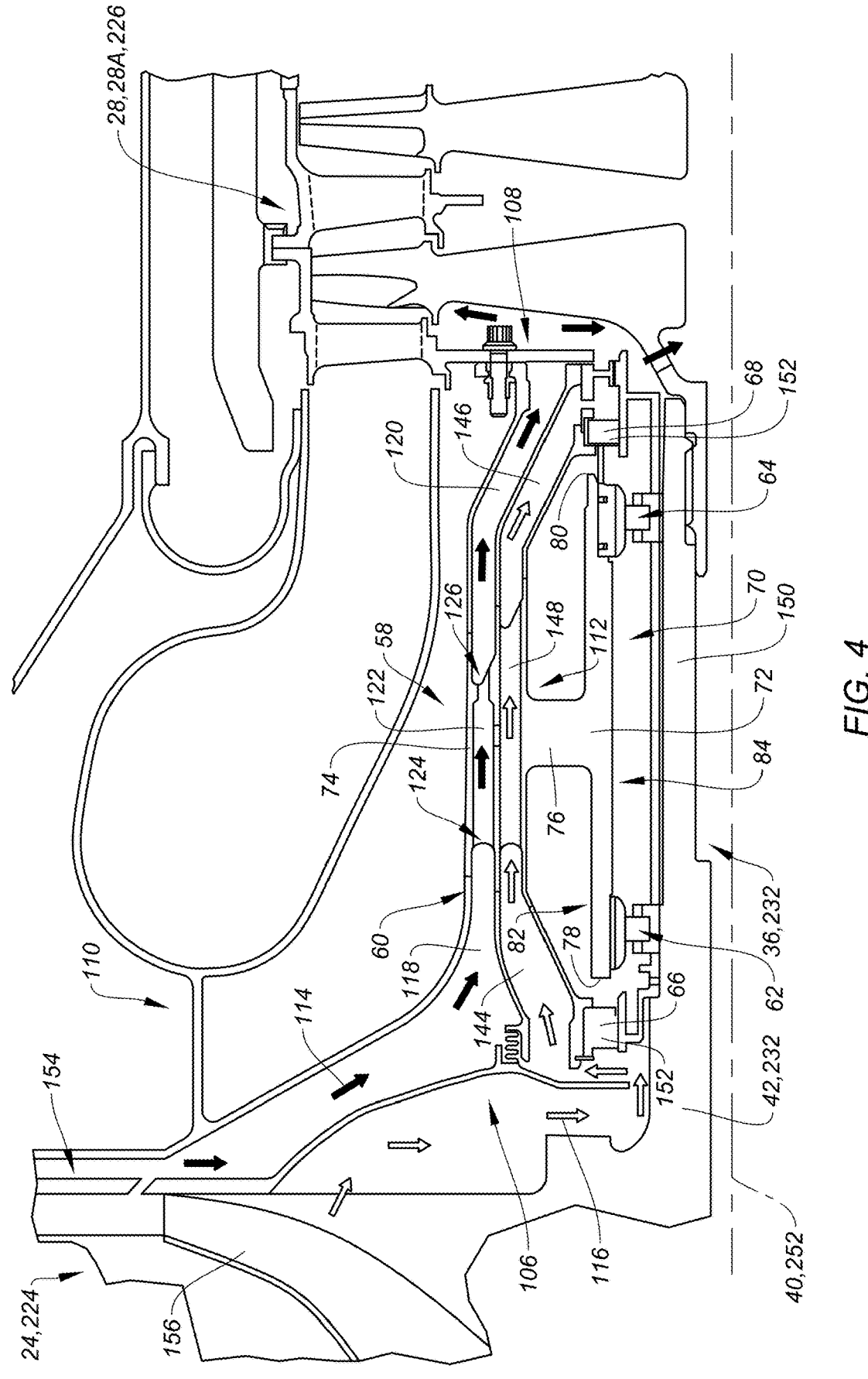
FIG. 4 illustrates a cutaway, side view of a portion of a rotational assembly and a bearing assembly for the aircraft propulsion system, in accordance with one or more embodiments of the present disclosure.

FIG. 4 illustrates a cutaway, side view of a bearing assembly 58 of the propulsion system 20 (see FIGS. 2 and 3). The bearing assembly 58 of FIG. 4 may be configured to rotationally support the first rotational assembly 36 (e.g., the first shaft 42) (see FIG. 2). Alternatively, the bearing assembly 58 may be configured to rotationally support the turbo-compressor rotational assembly 234 (see FIG. 3). The bearing assembly 58 includes a bearing compartment housing 60, a first bearing 62, a second bearing 64, a first bearing seal 66, and a second bearing seal 68.

The housing 60 surrounds and forms a bearing compartment 70 of the bearing assembly 58. The housing 60 additionally supports the first bearing 62, the second bearing 64, the first bearing seal 66, and the second bearing seal 68. The housing 60 includes an annular inner housing body 72, an annular outer housing body 74, and a plurality of struts 76.

Figure 5:
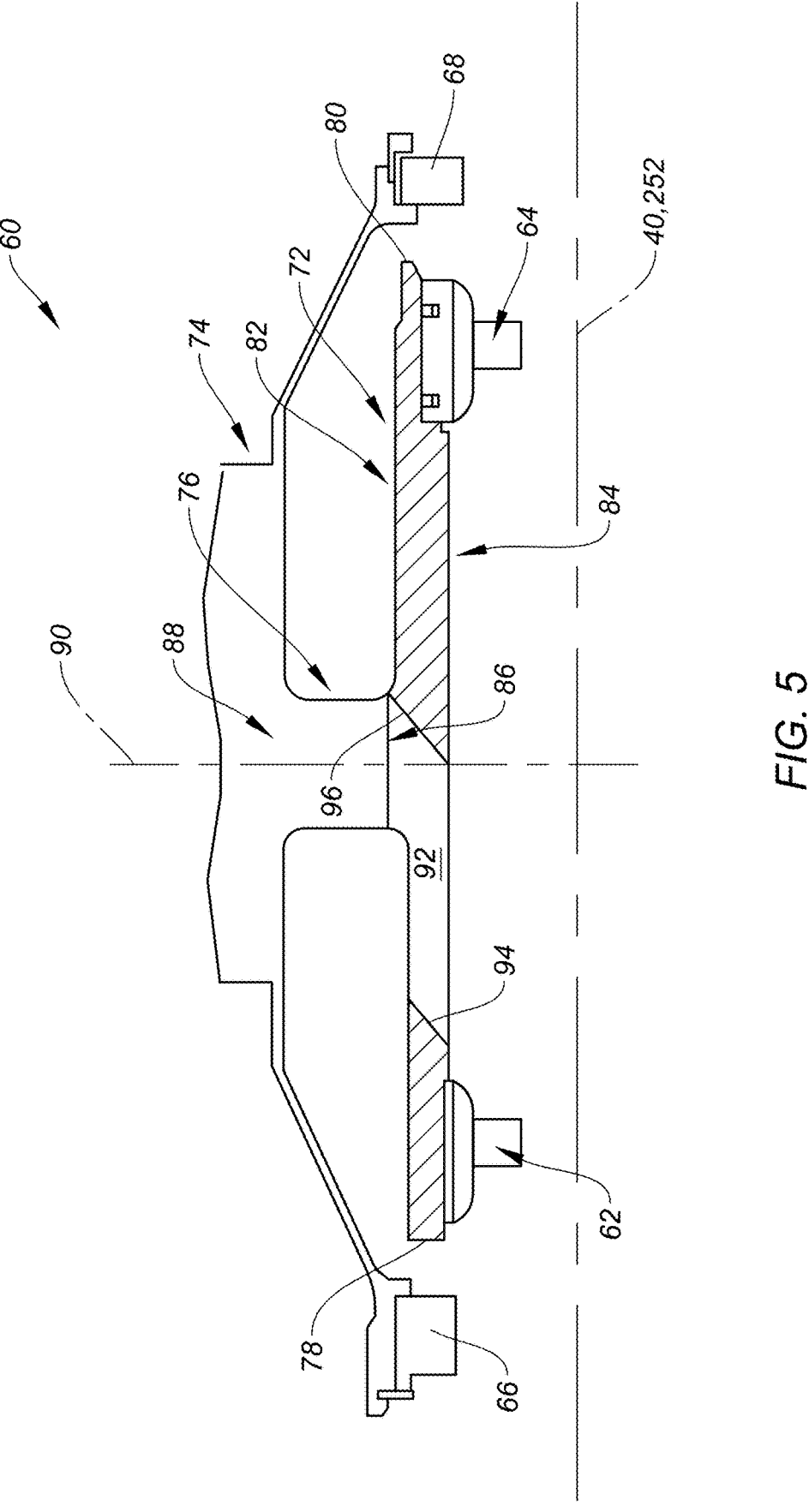
FIG. 5 illustrates a cutaway, side view of a portion of a bearing compartment housing of the bearing assembly, in accordance with one or more embodiments of the present disclosure.
Figures 6, 7:
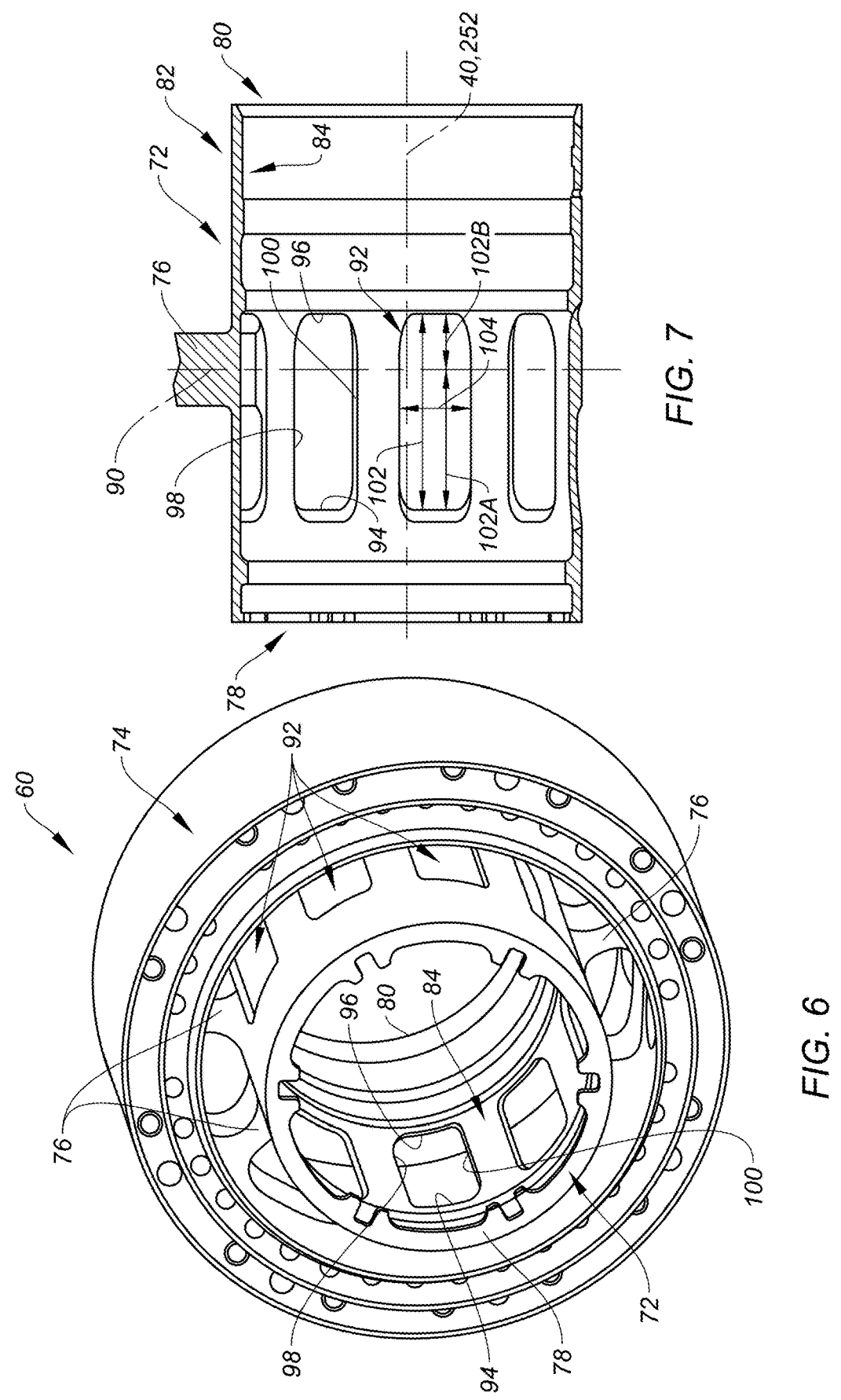
FIG. 6 illustrates a perspective view of a portion of the bearing compartment housing of FIG. 5, in accordance with one or more embodiments of the present disclosure.
FIG. 7 illustrates another cutaway, side view of a portion of the bearing compartment housing of FIG. 5, in accordance with one or more embodiments of the present disclosure.

FIGS. 5-7 illustrate portions of the housing 60 showing, in particular, the inner housing body 72. FIG. 5 illustrates a partial cutaway, side view of the housing 60. FIG. 6 illustrates a perspective view of the housing 60. FIG. 7 illustrates another cutaway, side view of the inner housing body 72. The inner housing body 72 is disposed within (e.g., entirely within) the bearing compartment 70. The inner housing body 72 extends circumferentially about (e.g., completely around) the rotational axis 40, 252. The inner housing body 72 extends axially between and to a first axial side 78 of the inner housing body 72 and a second axial side 80 of the inner housing body 72. For example, the inner housing body 72 may be a tubular body extending between and to the first axial side 78 and the second axial side 80. The inner housing body 72 extends radially between and to an outer radial side 82 of the inner housing body 72 and an inner radial side 84 of the inner housing body 72.

The struts 76 extend between (e.g., radially between) and connect the inner housing body 72 and the outer housing body 74. In particular, each of the struts 76 extends (e.g., radially extend) between and to an inner end 86 on the inner housing body 72 and an outer end 88 on the outer housing body 74. The struts 76 are circumferentially distributed about the rotational axis 40, 252 to support the inner housing body 72 (and the bearings 62, 64) from the outer housing body 74. The struts 76 are arranged on the inner housing body 72 axially between the first axial side 78 and the second axial side 80. For example, the struts 76 may be arranged at (e.g., on, adjacent, or proximate) an axially intermediate portion of the inner housing body 72 such that a first axial portion of the inner housing body 72 extends from the struts 76 to the first axial side 78 and a second axial portion of the inner housing body 72 extends from the struts 76 to the second axial side 80. The struts 76 may be understood to be arranged along a strut center plane 90 orthogonal to the rotational axis 40, 252. For example, an axial center of each of the struts 76 may be positioned on the strut center plane 90.

The inner housing body 72 forms a plurality of transverse slots 92 of the housing 60. The transverse slots 92 may be understood as "transverse" in that they extend through the inner housing body 72 generally orthogonal to the rotational axis 40, 252, and the term "transverse" should not be understood to be otherwise limiting. Each of the transverse slots 92 extends through (e.g., radially through) the inner housing body 72 from the outer radial side 82 to the inner radial side 84. The inner housing body 72 forms a first axial end 94 and a second axial end 96 for each of the transverse slots 92. Each of the transverse slots 92 extends axially through the inner housing body 72 between and to the first axial end 94 and the second axial end 96. The transverse slots 92 may be disposed axially coincident with the struts 76 as shown, for example, in FIG. 5. As also shown in FIG. 5, each of the first axial end 94 and the second axial end 96 may be formed by the inner housing body 72 with an oblique orientation extending from the inner radial side 84 to the outer radial side 82. This oblique orientation of the first axial end 94 and the second axial end 96 may facilitate ease of machining of the transverse slots 92 for the annular inner housing body 72.

The inner housing body 72 forms a first circumferential end 98 and a second circumferential end 100 for each of the transverse slots 92. Each of the transverse slots 92 extends circumferentially through the inner housing body 72 between and to the first circumferential end 98 and the second circumferential end 100. The present disclosure, however, is not limited to any particular orientation of the first axial end 94 and the second axial end 96. The transverse slots 92 are circumferentially distributed about the rotational axis 40, 252. Each of the transverse slots 92 may be disposed circumferentially between a circumferentially adjacent pair of the struts 76. For each, one of the transverse slots 92 may be disposed circumferentially between each circumferentially adjacent pair of the struts 76.

As shown in FIG. 7, each of the transverse slots 92 has a length 102 (e.g., in the axial direction) and a width 104 (e.g., in the circumferential direction). The length 102 extends (e.g., axially extends) between and to the first axial end 94 and the second axial end 96. The length 102 of each of the transverse slots 92 may include a first length portion 102A and a second length portion 102B. The first length portion 102A extends (e.g., axially extends) between and to the first axial end 94 and the strut center plane 90. The second length portion 102B extends (e.g., axially extends) between and to the strut center plane 90 and the second axial end 96. Of course, in some embodiments, the transverse slots 92 may be disposed entirely on one axial side or the other of the strut center plane 90, and the length 102 may not include the length portion 102A, 102B components previously described. The width 104 extends (e.g., circumferentially extends) between and to the first circumferential end 98 and the second circumferential end 100.

As will be discussed in further detail, characteristics of the transverse slots 92 such as, but not limited to, size (e.g., the length 102, the width 104, etc.), shape, position, and/or orientation of the transverse slots 92, may be selected to control a stiffness of the housing 60 at the first bearing 62 and the second bearing 64. The transverse slots 92 of FIGS. 5-7 are configured to facilitate a reduced stiffness of the housing 60 at the first bearing 62 relative to the second bearing 64. The transverse slots 92 of FIGS. 5-7 are disposed closer (e.g., axially closer) to the first bearing 62 than the second bearing 64. For example, the first length portion 102A of each of the transverse slots 92 is greater than the second length portion 102B of each of the transverse slots 92. The first length portion 102A may be significantly greater than the second length portion 102B, for example, two times greater, three times greater, four times greater, etc., as needed to control relative stiffnesses of the housing 60 at the first bearing 62 and the second bearing 64. Alternatively, the second length portion 102B may be greater than the first length portion 102A to reduce a stiffness of the housing 60 at the second bearing 64 relative to the first bearing 62. The present disclosure is not limited to the foregoing exemplary configurations of the transverse slots 92 as illustrated in FIGS. 5-7 and described above.

Figure 8:
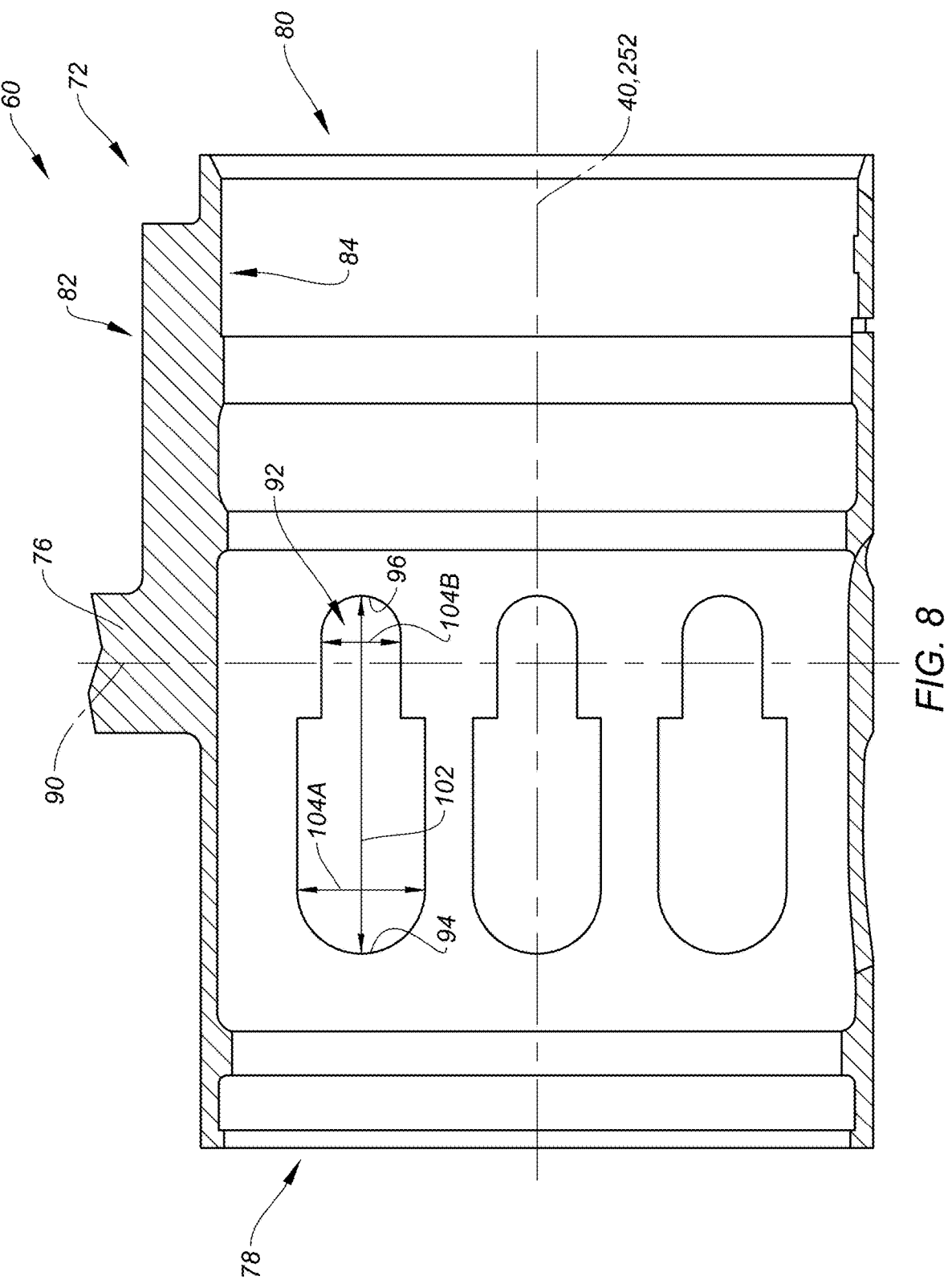
FIG. 8 illustrates a cutaway, side view of a portion of another bearing compartment housing, in accordance with one or more embodiments of the present disclosure.

Referring to FIG. 8, in some embodiments, a shape of the transverse slots 92 may be selected to facilitate selective control of the housing 60 stiffnesses at the first bearing 62 and the second bearing 64 (see FIG. 5). For example, as shown in FIG. 8, a width 104 of each of the transverse slots 92 may vary along their respective lengths 102. The transverse slots 92 of FIG. 8 have a first width 104A at (e.g., on, adjacent, or proximate) the first axial end 94 and a second width 104B at (e.g., on, adjacent, or proximate) the second axial end 96. The first width 104A is different than (e.g., greater than) the second axial width 104B. The shape of the transverse slots 92 of FIG. 8 may facilitate a reduced stiffness of the housing 60 at the first bearing 62 relative to the second bearing 64. The shape of the transverse slots 92 of FIG. 8 (e.g., the reduced second width 104B) may additionally accommodate the circumferential span of the struts 76 at the outer radial side 82.

Figure 9:
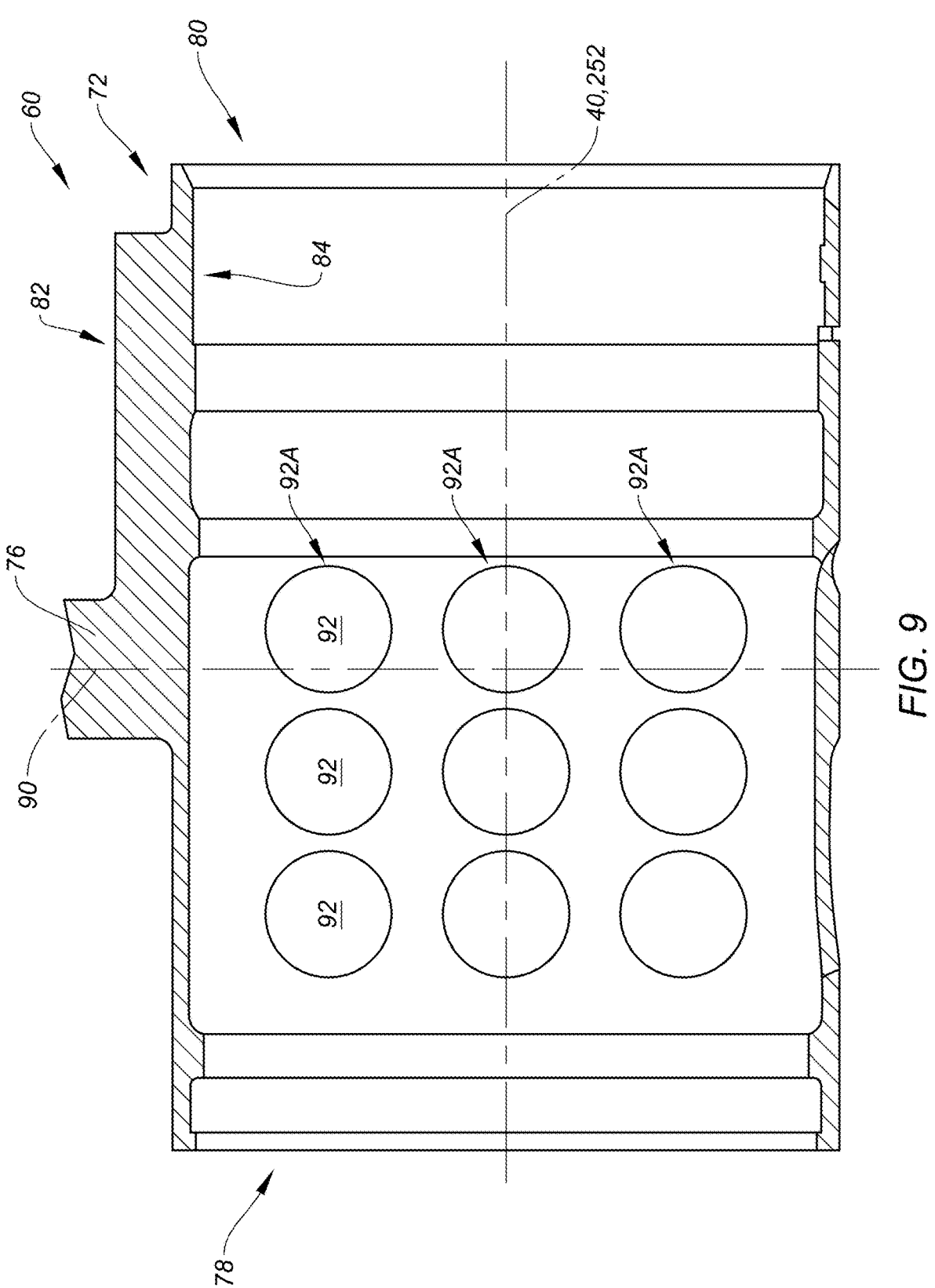
FIG. 9 illustrates a cutaway, side view of a portion of another bearing compartment housing, in accordance with one or more embodiments of the present disclosure.

Referring to FIG. 9, in some embodiments, the transverse slots 92 may include more than one of the transverse slots 92 between a (or each) circumferentially adjacent pair of the struts 76. For example, the inner housing body 72 of FIG. 9 forms an axial arrangement 92A of multiple (e.g., three in FIG. 9) transverse slots 92 circumferentially between each circumferentially adjacent pair of the struts 76. The transverse slots 92 of the axial arrangements 92A may have a same shape and size as shown, for example, in FIG. 9. Alternatively, a shape and/or size of the transverse slots 92 within one of the axial arrangements 92A may vary. For example, a size (e.g., a diameter) of the transverse slots 92 within the axial arrangements 92A may decrease in an axial direction from the first axial end 94 to the second axial end 96.

Figure 10:
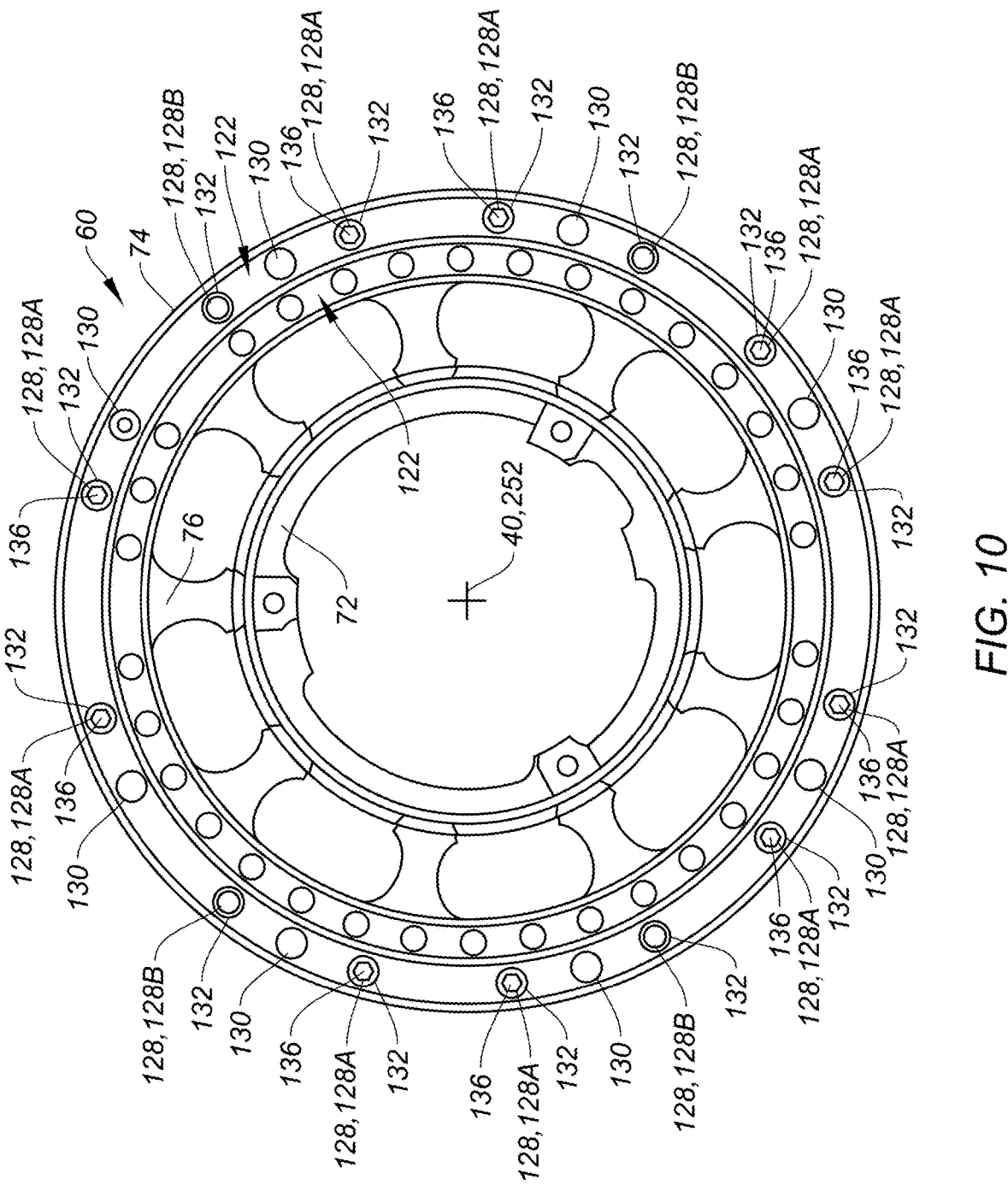
FIG. 10 illustrates a front view of a bearing compartment housing of the bearing assembly, in accordance with one or more embodiments of the present disclosure.

Referring to FIGS. 4 and 10, the outer housing body 74 is configured to form the bearing compartment 70 and to direct compressed air (e.g., air from the compressor section 24, 224) to the bearing compartment 70 as well as other components of the propulsion system 20 such as, but not limited to, the turbine section 28, 226. The outer housing body 74 extends circumferentially about (e.g., completely around) the rotational axis 40, 252. The outer housing body 74 extends axially between and to a first axial side 106 of the outer housing body 74 and a second axial side 108 of the outer housing body 74. The first axial side 106 may be disposed at (e.g., on, adjacent, or proximate) the compressor section 24, 224. The second axial side 108 may be disposed at (e.g., on, adjacent, or proximate) the turbine section 28, 226. The outer housing body 74 may be mounted to one or more static structure components (e.g., casings) of the compressor section 24, 224 and/or the turbine section 28, 226 at (e.g., on, adjacent, or proximate) the first axial side 106 and/or the second axial side 108, respectively. The outer housing body 74 extends radially between and to an outer radial side 110 of the outer housing body 74 and an inner radial side 112 of the outer housing body 74. The inner radial side 112 is disposed at the struts 76.

The outer housing body 74 may form a first air flow path 114 and a second air flow path 116 through the outer housing body 74. The first air flow path 114 of FIG. 4 is disposed radially outward of the second air flow path 116 of FIG. 4. The present disclosure, however, is not limited to this particular orientation of the first air flow path 114 and the second air flow path 116. The first air flow path 114 may be independent of (e.g., fluidly isolated from) the second air flow path 116 through the outer housing body 74.

The outer housing body 74 may form an inlet plenum 118, an outlet plenum 120, and a plurality of feed holes 122 forming the first air flow path 114. The outer housing body 74 forms the inlet plenum 118 at (e.g., on, adjacent, or proximate) the first axial side 106. The inlet plenum 118 is connected in fluid communication with a first air source. For example, the inlet plenum 118 may be connected in fluid communication with the compressor section 24, 224 at the first air source (e.g., a stage, outlet, or other portion of an air flow path through the compressor section 24, 224). The inlet plenum 118 may be configured as an annular plenum extending circumferentially about (e.g., completely around) the rotational axis 40, 252. The outer housing body 74 forms the outlet plenum 120 at (e.g., on, adjacent, or proximate) the second axial side 108. The outlet plenum 120 is connected in fluid communication with the turbine section 28, 226 (e.g., the high-pressure turbine section 28A). The outlet plenum 120 may be configured as an annular plenum extending circumferentially about (e.g., completely around) the rotational axis 40, 252. The outer housing body 74 forms the feed holes 122 between (e.g., axially between) the inlet plenum 118 and the outlet plenum 120. Each of the feed holes 122 extends (e.g., axially extends) between and connects the inlet plenum 118 and the outlet plenum 120 in fluid communication. The feed holes 122 are circumferentially arrayed about the rotational axis 40, 252 as shown, for example, in FIG. 10. Each of the feed holes 122 extends (e.g., axially extends) between and to a first axial end 124 of each respective feed hole 122 and a second axial end 126 of each respective feed hole 122. The first axial end 124 is disposed at (e.g., on, adjacent, or proximate) the inlet plenum 118. The second axial end 126 is disposed at (e.g., on, adjacent, or proximate) the outlet plenum 120. The outer housing body 74 may form the inlet plenum 118 and the feed holes 122 such that the feed holes 122 are axially unobstructed (e.g., by the outer housing body 74) from the first axial side 106 to the first axial end 124.

Figure 11:
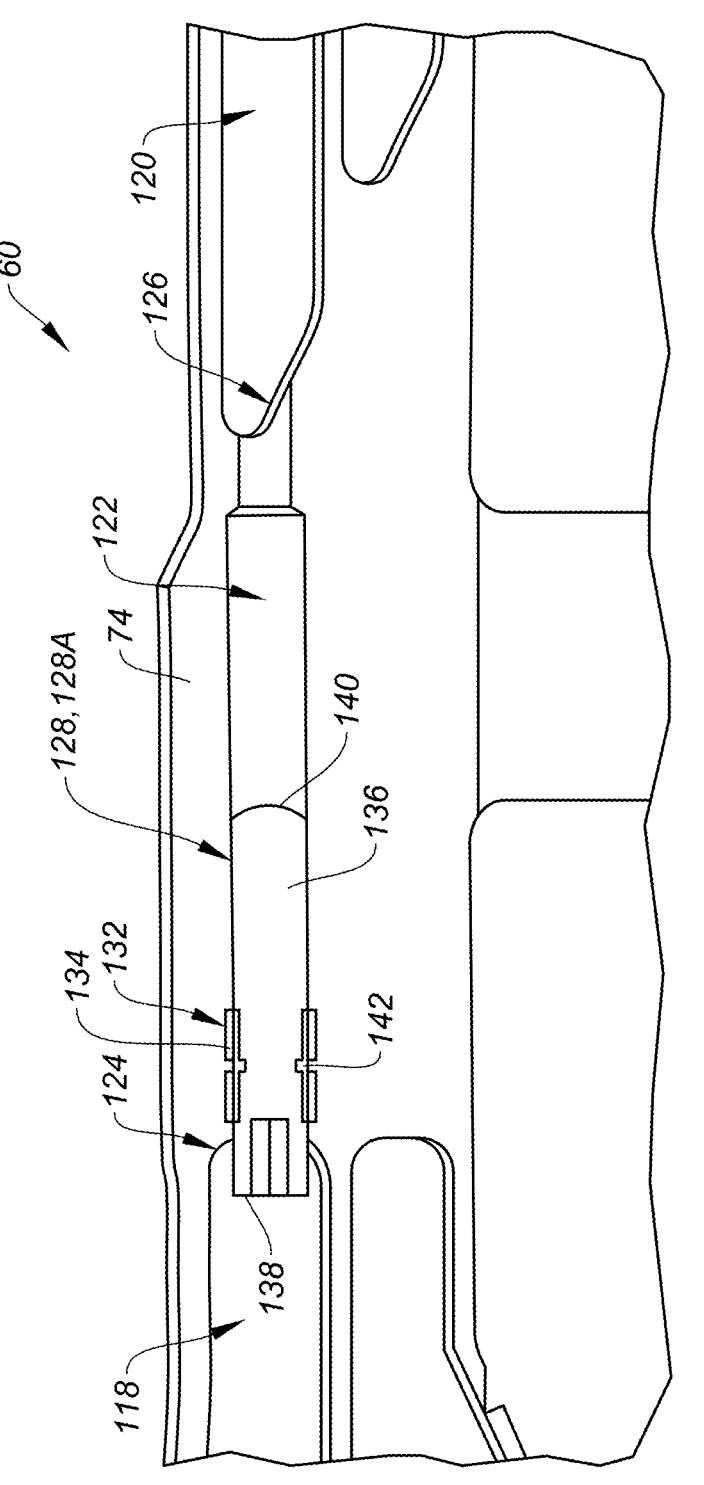
FIG. 11 illustrates a cutaway, side view of a portion of the bearing compartment housing of FIG. 10 including a feed hole and a feed hole plug, in accordance with one or more embodiments of the present disclosure.

The feed holes 122 may include one or more first feed holes 128 (e.g., a first subset of the feed holes 122) and one or more second feed holes 130 (e.g., a second subset of the feed holes 122). Each of the first feed holes 128 is a threaded feed hole and each of the second feed holes 130 is an unthreaded feed hole (e.g., a feed hole which does not include a threading interface). FIG. 11 illustrates a cutaway, side view of a portion of the outer housing body 74 including one of the first feed holes 128. Each of the first feed holes 128 includes a threading interface 132 (e.g., a helical threading). The threading interface 132 may be disposed at (e.g., on, adjacent, or proximate) the first axial end 124. The threading interface 132 of FIG. 11 is formed by a threading insert 134 mounted within the outer housing body 74 and circumscribing a respective one of the first feed holes 128. Examples of the threading insert 134 include, but are not limited to, those threaded inserts sold by Böllhoff Produktion GmbH (Bielefeld, Germany) under its HELI-COIL® and HELICOIL® trademarks. Alternatively, the threading interface 132 may be formed by the outer housing body 74. The first feed holes 128 and the second feed holes 130 may be circumferentially arrayed about the rotational axis 40, 252 as shown, for example, in FIG. 10. In some embodiments, each of the feed holes 122 may be threaded feed holes. In other words, all of the feed holes 122 may be the first feed holes 128.

The outer housing body 74 may include one or more feed hole plugs 136. Each of the feed hole plugs 136 may be configured as a threaded fastener extending between and to a first axial end 138 of each of the feed hole plugs 136 and a second axial end 140 of each of the feed hole plugs 136. Each of the feed hole plugs 136 includes a threading interface 142 configured for threaded engagement with the threading interface 132. The feed hole plugs 136 may have a headless configuration on the first axial end 138 (e.g., the feed hole plugs 136 may not include a radially-enlarged head portion). The headless configuration of the feed hole plugs 136 may facilitate a reduction in the radial envelope of the feed hole plugs 136 within the constrained space of the outer housing body 74. However, the feed hole plugs 136 may alternatively include a radially-enlarged head portion on the first axial end 138. Each of the feed hole plugs 136, installed in a respective one of the first feed holes 128, obstructs all or substantially all air flow through the respective one of the first feed holes 128.

The feed hole plugs 136 may be installed in none, some, or all of the first feed holes 128 to facilitate control of air flow along the first air flow path 114. As shown in FIG. 10, for example, the first feed holes 128 and the feed hole plugs 136 may form one or more obstructed feed holes 128A of the first feed holes 128 and one or more unobstructed feed holes 128B of the first feed holes 128. All or substantially all air flow into and through the obstructed feed holes 128A (e.g., from the inlet plenum 118 to the outlet plenum 120) may be obstructed (e.g., by the feed hole plugs 136). In contrast, air flow along the first air flow path 114 may be directed from the inlet plenum 118 to the outlet plenum 120 through the unobstructed feed holes 128B and the second feed holes 130.

The outer housing body 74 may form an inlet plenum 144, an outlet plenum 146, and a plurality of feed holes 148 forming the second air flow path 116. The outer housing body 74 forms the inlet plenum 144 at (e.g., on, adjacent, or proximate) the first axial side 106. The inlet plenum 144 is connected in fluid communication with a second air source, which second air source may be different than the first air source connected in fluid communication with the inlet plenum 118. For example, the inlet plenum 144 may be connected in fluid communication with the compressor section 24, 224 at the second air source (e.g., a stage, outlet, or other portion of an air flow path through the compressor section 24, 224). The inlet plenum 144 may be configured as an annular plenum extending circumferentially about (e.g., completely around) the rotational axis 40, 252. The outer housing body 74 forms the outlet plenum 146 at (e.g., on, adjacent, or proximate) the second axial side 108. The outlet plenum 146 is connected in fluid communication with the bearing compartment 70. The outlet plenum 146 may be configured as an annular plenum extending circumferentially about (e.g., completely around) the rotational axis 40, 252. The outer housing body 74 forms the feed holes 148 between (e.g., axially between) the inlet plenum 144 and the outlet plenum 146. Each of the feed holes 148 extends (e.g., axially extends) between and connects the inlet plenum 144 and the outlet plenum 146 in fluid communication.

Referring again to FIG. 4, the first bearing 62 and the second bearing 64 are mounted to the inner housing body 72 (e.g., on the inner radial side 84) within the bearing compartment 70. The first bearing 62 is mounted on the inner housing body 72 (e.g., the inner radial side 84) at (e.g., on, adjacent, or proximate) the first axial side 78. The second bearing 64 is mounted on the inner housing body 72 (e.g., the inner radial side 84) at (e.g., on, adjacent, or proximate) the second axial side 80. The first bearing 62 and the second bearing 64 are disposed on axially opposing sides of the struts 76. Each of the bearings 62, 64 is engaged with a rotational assembly such as, but not limited to, the first rotational assembly 36 (e.g., the first shaft 42) or the turbo-compressor rotational assembly 234 (e.g., the shaft 232) to rotationally support the rotational assembly. For example, the bearings 62, 64 of FIG. 4 are engaged with a shaft 150 such as, but not limited to the shaft 42 or the shaft 232 (see FIGS. 2 and 3).

The first bearing seal 66 and the second bearing seal 68 are mounted on or otherwise supported by the outer housing body 74. The first bearing seal 66 and the second bearing seal 68 may each include a carbon seal 152 (e.g., an annular carbon seal) configured for sealing engagement with the shaft 150. The present disclosure, however, is not limited to the inclusion of a carbon seal for the first bearing seal 66 and the second bearing seal 68. The first bearing seal 66 is disposed at (e.g., on, adjacent, or proximate) the first axial side 106 and the inner radial side 112. The first bearing seal 66 is positioned in sealing engagement with the shaft 150, for example, to seal a first axial end (e.g., a forward end) of the bearing compartment 70. The second bearing seal 68 is disposed at (e.g., on, adjacent, or proximate) the second axial side 108 and the inner radial side 112. The second bearing seal 68 is positioned in sealing engagement with the shaft 150, for example, to seal a second axial end (e.g., an aft end) of the bearing compartment 70. The first bearing seal 66 and the second bearing seal 68 are positioned along and in fluid communication with the second air flow path 116. The first bearing seal 66 and the second bearing seal 68 are separated from the first air flow path 114 by the second air flow path 116 and the outer housing body 74.

In operation of the propulsion system 20 and its bearing assembly 58, a stiffness of the bearing compartment housing 60 may have a significant impact on dynamics of the rotational assemblies (e.g., the rotational assemblies 36, 38, 234; see FIGS. 2 and 3). This stiffness may facilitate suppression of dynamic instabilities and may also influence natural frequencies and critical speeds of the associated rotational assembly. A critical speed may be understood as a rotational speed of a rotational assembly at which the natural frequency of the rotational assembly coincides with its excitation frequency, leading to resonance and potentially harmful vibration.

The bearing assembly 58 of the present disclosure includes the first bearing 62 and the second bearing 64 together on the inner housing body 72 supported from the outer housing body 74 by the struts 76. This configuration of the housing 60 and the bearings 62, 64 facilitates improved rotational assembly stability, enhanced load capacity, reduced vibration, and alignment of the rotational assembly. However, the first bearing 62 and the second bearing 64 may benefit from different stiffnesses of the housing 60, to provide improved control over their respective critical speeds, and thereby facilitate further resonance avoidance and improved dynamic response. While structural characteristics of the outer housing body 74 may be selected to control housing 60 stiffness at the bearings 62, 64, these structural characteristics may affect the first bearing 62 and the second bearing 64 equally or substantially equally and, therefore, may not accommodate the optimal and different respective stiffnesses of the first bearing 62 and the second bearing 64. The present disclosure inner housing body 72 and the transverse slots 92 facilitates greater control of the relative housing stiffness for the first bearing 62 and the second bearing 64.

In embodiments of the bearing compartment housing 60 forming the first air flow path 114 and the second air flow path 116, as described above, compressed bleed air from the compressor section 24, 224 may be directed through the housing 60 along the first air flow path 114. The compressed bleed air along the first air flow path 114 may be directed from an outlet or intermediate compressor stage of the compressor section 24, 224. For example, the first air flow path 114 may be connected in fluid communication with a compressor diffuser 154 of the compressor section 24, 224 to receive the compressed bleed air. This compressed bleed air from the compressor diffuser 154 may be referred to as "P3" air. The compressed bleed air along the first air flow path 114 may be directed by the outer housing body 74 to the turbine section 28, 226 (e.g., the high-pressure turbine section 28A), for example, to facilitate cooling of the bladed first turbine rotor 46 and other turbine section 28 components. The configuration of the first feed holes 128 and the feed hole plugs 136 may facilitate control of a flow rate of the compressed bleed air supplied to the turbine section 28, 226 by allowing the flow rate of the compressed bleed air to be selectively aligned with the requirements of the propulsion system 20 in which the housing 60 is installed. For example, a technician may install a selected quantity of the feed hole plugs 136 into one or more respective holes of the first feed holes 128 to form the obstructed feed holes 128A and the unobstructed feed holes 128B for the particular propulsion system 20 in which the housing 60 is installed. The housing 60 may, therefore, facilitate control of the supply of compressed bleed air to the turbine section 28, 226 for a plurality of different propulsion system 20 configurations (e.g., different engine or turbo-compressor models) having different turbine section 28, 226 cooling needs, while using a same housing body (e.g., the inner housing body 72 and the outer housing body 74).

Compressed bleed air from the compressor section 24, 224 may also be directed through the housing 60 along the second air flow path 116. The compressed bleed air along the second air flow path 116 may be directed from an intermediate compressor stage of the compressor section 24, 224. The compressed air along the second air flow path 116 may be supplied from a compressor stage which is upstream of the outlet or compressor stage supplying the compressed bleed air (e.g., the P3 air) to the first air flow path 114. In other words, the compressed bleed air supplied to the first air flow path 114 may have a greater pressure than the compressed bleed air supplied to the second air flow path 116. For example, the second air flow path 116 may be connected in fluid communication with the compressor section 24, 224 at an impeller 156 (e.g., a portion of a bladed compressor rotor) of the compressor section 24, 224. This compressed bleed air may be referred to as "P2.9" air. The compressed bleed air (e.g., the P2.9 air) along the second air flow path 116 may be used to facilitate sealing of the bearing compartment 70 (e.g., in combination with the first bearing seal 66). This compressed bleed air may flow along the second air flow path 116 into and through the outlet plenum 146 where the compressed bleed air may be used to facilitate sealing of the bearing compartment 70 (e.g., in combination with the second bearing seal 68). The compressed bleed air along the second air flow path 116 may be further directed into the bearing compartment 70, for example, to facilitate buffering and cooling of the bearing compartment 70 and bearing assembly 58 components therein. The multiple layers of cooling air provided by the first air flow path 114 and the second air flow path 116 may facilitate more precise control of bearing compartment 70 temperatures (e.g., oil temperatures), while also adding redundancy and increased reliability for bearing compartment 70 cooling.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An engine for an aircraft propulsion system, the engine comprising:

a rotational assembly including a shaft, and the shaft is rotatable about a rotational axis; and a bearing assembly including a bearing compartment housing, a first bearing, and a second bearing, the bearing compartment housing extends circumferentially about the rotational axis, the bearing compartment housing includes an outer housing body, an inner housing body, and a plurality of struts, the outer housing body surrounds and forms a bearing compartment, the inner housing body is disposed within the bearing compartment, the inner housing body extends between and to an inner radial side and an outer radial side, the inner housing body forms a plurality of transverse slots extending through the inner housing body from the inner radial side to the outer radial side, and the plurality of struts extend radially between and connect the inner housing body and the outer housing body at the outer radial side, the first bearing is mounted on the inner housing body at a first axial position, and the first bearing is rotationally engaged with the shaft, and the second bearing is mounted on the inner housing body at a second axial position, different than the first axial position, and the second bearing is rotationally engaged with the shaft;

wherein the outer housing body is disposed radially outward of and extends axially coincident with the inner housing body, the first bearing, the second bearing, the plurality of struts, and the plurality of transverse slots.

2. The engine of claim 1, wherein the inner housing body extends axially between and to a first axial side and a second axial side, the first bearing is disposed at the first axial side, and the second bearing is disposed at the second axial side.

3. The engine of claim 1, wherein the plurality of struts are disposed axially between the first bearing and the second bearing.

4. The engine of claim 1, wherein the plurality of transverse slots are disposed axially coincident with the plurality of struts.

5. The engine of claim 1, wherein each of the plurality of transverse slots is disposed circumferentially between each circumferentially adjacent pair of the plurality of struts.

6. The engine of claim 1, wherein more than one of the plurality of transverse slots is disposed circumferentially between each circumferentially adjacent pair of the plurality of struts.

7. The engine of claim 1, wherein the plurality of transverse slots are axially closer to the first bearing than the second bearing.

8. The engine of claim 1, wherein:

the plurality of struts have a strut center plane orthogonal to the rotational axis, and each of the plurality of transverse slots extends axially between and to a first axial end and a second axial end, each of the plurality of transverse slots has a length extending axially between and to the first axial end and the second axial end, the length has a first length portion and a second length portion, the first length portion extends between and to the first axial end and the strut center plane, and the second length portion extends between and to the strut center plane and the second axial end.

9. The engine of claim 8, wherein the first length portion is greater than the second length portion.

10. The engine of claim 8, wherein each of the plurality of transverse slots extends between and to a first circumferential end and a second circumferential end, each of the transverse slots has a width extending between and to the first circumferential end and the second circumferential end, and the width varies along the length.

11. An engine for an aircraft propulsion system, the engine comprising:

a rotational assembly including a shaft, and the shaft is rotatable about a rotational axis; and a bearing assembly including a bearing compartment housing, a first bearing, and a second bearing, the bearing compartment housing extends circumferentially about the rotational axis, the bearing compartment housing includes an outer housing body, an inner housing body, and a plurality of struts, the outer housing body surrounds and forms a bearing compartment, the inner housing body is disposed within the bearing compartment, the inner housing body extends between and to an inner radial side and an outer radial side, the inner housing body forms a plurality of transverse slots extending through the inner housing body from the inner radial side to the outer radial side, each of the plurality of transverse slots is disposed circumferentially between a circumferentially adjacent pair of the plurality of struts, and the plurality of struts extend radially between and connect the inner housing body and the outer housing body at the outer radial side, and the first bearing and the second bearing are mounted on the inner housing body and rotationally engaged with the shaft;

wherein each of the plurality of transverse slots are separate from each other and have a rectangular shape.

12. The engine of claim 11, wherein the plurality of transverse slots are axially closer to the first bearing than the second bearing.

13. The engine of claim 11, wherein:

the plurality of struts have a strut center plane orthogonal to the rotational axis, each of the plurality of transverse slots extends axially between and to a first axial end and a second axial end, each of the plurality of transverse slots has a length extending axially between and to the first axial end and the second axial end, the length has a first length portion and a second length portion, the first length portion extends between and to the first axial end and the strut center plane, and the second length portion extends between and to the strut center plane and the second axial end.

14. The engine of claim 13, wherein the first length portion is greater than the second length portion.

\* \* \* \* \*